United States Patent
Qin et al.

(10) Patent No.: US 12,166,526 B2
(45) Date of Patent: Dec. 10, 2024

(54) POWER TRANSIENT EVENT DETECTION IN OPTICAL COMMUNICATION SYSTEMS

(71) Applicant: Microsoft Technology Licensing, LLC, Redmond, WA (US)

(72) Inventors: Chuan Qin, Bellevue, WA (US); Binbin Guan, Redmond, WA (US); Yawei Yin, Redmond, WA (US); Liban Buni, Aurora, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 18/069,694

(22) Filed: Dec. 21, 2022

(65) Prior Publication Data
US 2024/0214069 A1 Jun. 27, 2024

(51) Int. Cl.
*H04B 10/079* (2013.01)

(52) U.S. Cl.
CPC ... *H04B 10/07955* (2013.01); *H04B 10/0793* (2013.01)

(58) Field of Classification Search
None
See application file for complete search history.

(56) References Cited

FOREIGN PATENT DOCUMENTS

| EP | 3843292 A2 * | 6/2021 | ............... H04B 1/59 |
| WO | WO-2021032292 A1 * | 2/2021 | ......... H04B 10/0771 |

OTHER PUBLICATIONS

International Search Report and Written Opinion received for PCT Application No. PCT/US23/081707, mailed on Mar. 27, 2024, 13 pages.

* cited by examiner

*Primary Examiner* — David W Lambert
(74) *Attorney, Agent, or Firm* — Holzer Patel Drennan (57) ABSTRACT

A power transient event detection system includes a first bank of photodetectors (PDs) located within a first node of an optical communication system. Each PD within the first bank of PDs has a different response time. The system further includes an output signal monitor that monitors signal output from each of the PDs in the first bank and that logs power transient event detection information. A transient event characterizer identifies, based on the logged event detection information, a subset of the PDs in the first bank that observed a power transient event, and determines a duration of the power transient event based on an amount of time that the signal output satisfies low signal criteria for at least one PD in the subset.

18 Claims, 7 Drawing Sheets

POWER TRANSIENT EVENT DETECTION IN OPTICAL COMMUNICATION SYSTEMS

BACKGROUND

Optical communication networks currently provide much of the infrastructure that facilitates long-range communication of telephone signals, cable television signals, and Internet communications. These networks convert electronic signals into pulses of light and transmit the light along optical fibers that physically connect communication endpoints.

Within optical communication systems, a variety of environmental forces can lead to power transient events characterized by temporary reductions in signal power that can impact communications. For example, vibrations due to a construction project can contribute noise to a nearby optical line. Signal noise can also be introduced by direct physical forces, such as a tree root impinging on an underground cable, wind, or other adverse weather. In all of these scenarios, the optical signals can be rendered undecipherable, resulting in dropped links (communication outages) and/or data loss.

When a power transient event occurs, effective troubleshooting depends upon the ability to quickly identify characteristics of the power transient event and use such information to identify appropriate corrective actions. In particular, the duration of the power transient event can provide vital clues that allow for identifying the most likely cause of the power transient event. Additionally, it is important to be able to identify the physical source (location) of the power transient event so that a crew can, if necessary, be deployed to perform line maintenance, such as by improving protections for the line with respect to the surrounding environment or replacing damaged sections of optical fiber.

SUMMARY

According to one implementation, a power transient event detection system Includes a first bank of photodetectors (PDs) located at a first node in an optical communication system. Each PD within the first bank of PDs has a different response time. The system further includes an output signal monitor configured to monitor signal output from each of the PDs in the first bank, and a transient event characterizer that identifies, based on the signal output monitored for each of the PDs, a subset of the PDs in the first bank that observed a power transient event. The transient event characterizer further determines a duration of the power transient event based on an amount of time that the signal output satisfies low signal criteria for at least one PD in the subset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

One particular challenge in the operation of optical communication networks pertains to effective diagnostics for power transient events that are less than a few minutes in duration. In many cases, noise introduced by the external environment can degrade optical signals enough to cause links to be temporarily dropped, such as for a few seconds. These types of events can affect large portions of a network and be burdensome to customers utilizing the network, such as by disrupting video streaming, dropping cell phone calls, and severing point-to-point internet connections that have to be reestablished once the network link is restored.

Existing diagnostic tools are generally ineffective at diagnosing characteristics of these shorter power transient events. One existing diagnostic approach provides for using an optical time domain reflectometer (OTDR) to inject a signal at one network node and to measure characteristics of the reflected signal, effectively mapping out how the signal changes with distance along the optical fiber. However, a single OTDR signal trace can take several minutes to complete, and a localized power transient event is typically not detected by this method if the event is shorter than the entire duration of the signal trace.

The herein disclosed technology provides tools and techniques for efficiently determining characteristics of short-term power transient events in optical communication systems. As used herein, a power transient event refers to a signal disruption causing a temporarily reduction in received signal power at a particular system node. The disclosed technology is designed to detect short-term power transient events, meaning events that typically last for less than a minute, such as on the order of a few seconds of a fraction of a second. Despite their brevity, these short-term power transient events can cause large-scale communication disruptions.

According to one implementation, the disclosed systems and methods facilitate accurate measurement of the duration of short-term power transient events. This accurate measurement capability allows operators to quickly determine the most likely cause of such events. For example, a sub-second event may be indicative of vibrations imparted by a nearby construction project while a multi-second (e.g., 2-3 second) event may be more likely due to strong winds.

According to another implementation, the disclosed systems and methods facilitate accurate identification of a physical origin of a short-term power transient event along the length of the optical fiber between network nodes detecting the event. Accurately pinpointing the physical source of a short-term power event transient can also help an operator to quickly determine the cause of an event transient, such as by allowing the operator to assess publicly-available information pertaining to the conditions and/or characteristics of the identified location that may be impacting the optical line. Likewise, the ability to pinpoint the location of a short-term power event transient permits a team maintaining the optical network to quickly deploy a maintenance crew to the identified location.

Figure 1:
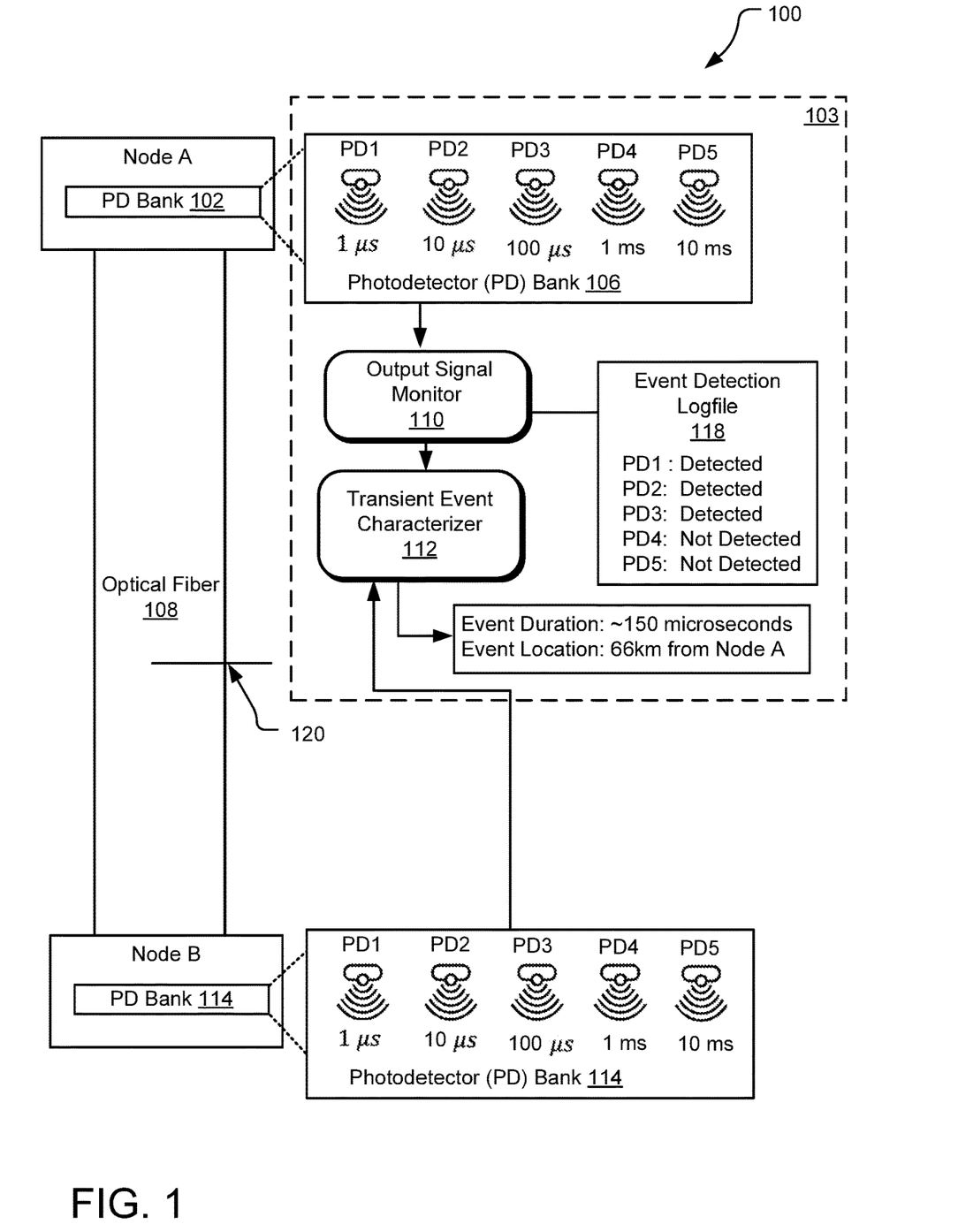
FIG. 1 illustrates aspects of an optical communication network implementing a power transient detection system for determining location and duration of short-term power transient events.

FIG. 1 illustrates aspects of an optical communication network 100 implementing a power transient detection system 103 for determining location and duration of short-term power transient events. The optical communication network 100 includes a number of nodes (e.g., node A and node B) interconnected by lengths of optical fiber 108. As used herein, a node refers to an optical line system. Optical line systems can have different forms, such as optical line terminals (OLTs) and optical line amplifiers (OLAs). An OLT is typically located at a terminal where transmitters and receivers are located (e.g., at source and destination endpoints for data in transit), and typically includes a frequency multiplexor/demultiplexer, optical amplifier, optical channel monitor (OCM), optical service channel (OSC), and other optical time domain reflectometer (OTDR) components. In contrast to an OLT, an OLA is at a location that is between terminals (data endpoints). In various optical networks, any number of OLAs may exist along a route between a pair of endpoints. Each pair of OLAs may, for example, be separated by a few tens of kilometers to slightly over a hundred kilometers. An OLA typically includes optical amplifiers, an OSC, and an OTDR.

The power transient detection system 103 includes photodetector (PD) banks (e.g., PD banks 106 and 114), each positioned at a different respective system nodes to collect data pertaining to signal quality observable on that node. Additionally, the power transient detection system 103 includes at least an output signal monitor 110 and transient event characterizer 112, which may be understood as consisting of software, or of a collection of hardware and software, with the software elements being stored in memory and executable by one or more system processors. The output signal monitor 110 records power transient event detection information observed by the individual PDs in the PD bank 106, and the transient event characterizer 112 analyzes the recorded power transient event detection information to identify characteristics of each observed short-term power transient event.

Functionality of the power transient detection system 103 is, in FIG. 1, shown and described primarily with respect to Node A; however, it is to be understood that the optical communication network 100 may include an additional PD bank, with characteristics similar to the PD Banks 106 and 114, at each of its multiple system nodes. Likewise, additional instances of the output signal monitor 110 and transient event characterizer 112 may execute at other system locations to support functionality on each of the multiple other system nodes in a manner the same or similar to that described below with respect to Node A. Software elements operating to analyze data collected at each node may be networked for peer-to-peer communications, facilitating data analysis on data sets collected from multiple nodes. In some implementations, an instance of the transient event characterizer 112 is executed in association with each different PD bank 102; in other implementations, the transient event characterizer 112 operates centrally in the sense that a single software component executes to determine characteristics of event transients located on two or more nodes of the optical communication network 100.

In FIG. 1, the photodetector (PD) bank 106 is positioned physically within Node A of the optical communication network 100. The PD bank 106 includes multiple photodetectors (PDs), also sometimes referred to as photosensors, that measure the intensity of incident light. Each PD in the PD bank 106 has a different response time. As used herein, the response time of a PD refers the time that it takes photocurrent generated by the PD to rise to a value that is at least a threshold percentage (e.g., 63.2%) of the final or steady-state value reached after a prolonged period of time. By example, the PD bank 106 is shown to include five PDs (e.g., PD1, PD2, PD2, PD3, PD4, and PD5) with respective response times of 1 microsecond (μs), 10 μs, 100 μs, 1 millisecond (ms), and 10 ms. In the illustrated example, the response times form a logarithmic distribution (e.g., $10^{-6}$, $10^{-5}$, $10^{-4}$, $10^{-3}$, and $10^{-2}$). While not required to implement the disclosed technology, the use of a PD Bank with PD response times characterized by a logarithmic distribution can facilitate capturing a large range of transient events with durations ranging approximately between that of the fastest PD response time to the slowest PD response time. In FIG. 1, both the PD response times and number of PDs in the PD bank 106 are intended to be exemplary, as various implementations may include banks with greater or fewer numbers of PDs with response times that span different ranges than those shown.

The PD bank 106 includes a circuit (not shown) with the PDs positioned in parallel to one another, ensuring that each PD in the PD bank 106 measures the same portion of an optical signal simultaneously. The output signal monitor 110 monitors signal output of the PDs in the PD bank 106, such as by continuously sampling the output signal of each one of the PDs in the PD bank 106. When a power transient event occurs, the event is detectable in the output signal of a subset of PDs that have response times less than or about equal to the duration of the event. For example, a two microsecond event is detectable by PD1 with the response time of 1 microsecond but is not likely to be detected by PDs that have response times significantly larger (e.g., 1.3× or greater) than the duration of the event because the event is simply not long enough to trigger a response in these photodetectors.

In one implementation, the output signal monitor 110 generates an alarm for a given PD whenever the signal output of a that PD satisfies "low signal criteria"—e.g., whenever the signal output (power) drops below a predefined threshold. The output signal monitor 110 clears the alarm for the given PD at a subsequent point in time when the signal output of the PD ceases to satisfy the low signal criteria—e.g., when the signal output rises back above the predefined threshold.

In the following description, a short-term power transient event is said to be observed or detected by a given PD if the event causes the output signal monitor 110 to trigger an alarm for the PD to and subsequently clear the alarm within a threshold period of time (e.g., less than one minute). Due to the variable response times of the PDs in the PD bank 106, a given event may be detected on fewer than all PDs in the PD bank 106. In addition, the subset of PDs that do detect a particular event may detect the event differently in the sense that there may exist differences in the elapsed time between alarm trigger and alarm clear on each PD that detects the event. This elapsed time during which the signal output satisfies the "low signal criteria" is referred to in the following description as the "alarm interval time."

As mentioned above, each short-term power transient event is detectable in the output signal of PDs in the PD bank 106 that have response times less than or about equal to the duration of the event. When a PD's response time is substantially less than the event duration (e.g., ~⅓ or less of the event duration), the PD's alarm interval time accurately maps to the duration of the event (e.g., with error<1.7% when PD response time<⅓ of the transient duration). However, as the PD's response time approaches the event duration, more error is introduced into the measurement and the alarm interval time for the PD diverges from the actual event duration.

The transient event characterizer 112 performs operations that rely on a relationship between PD response times and PD alarm interval times to determine the duration of each detected power transient event. Specifically, the transient event characterizer 112 identifies a subset of PDs that have observed a power transient event and then performs further operations to determine which, if any, of those PDs have characteristics that satisfy "accuracy criteria," which is discussed in greater detail below with respect to FIG. 2. If the PD's characteristics satisfy the accuracy criteria, the PD's alarm interval time is taken as a reliable indicator of the event duration. If none of the PDs in the PD bank 106 have characteristics satisfying the accuracy criteria, the transient event characterizer 112 may perform further analysis to estimate the event duration based on the alarm interval times of the PDs that detected the event. This analysis is discussed at least with respect to FIG. 5 below.

FIG. 1 illustrates exemplary data outputs generated by the output signal monitor 110 and the transient event characterizer 112 for a short-term power transient event lasting 150 microseconds. In this example, the output signal monitor 110 creates an event detection logfile 118 and records information indicating which of the PDs in the PD bank 106 detected the event. Although not explicitly shown in FIG. 1, the event detection logfile 118 may also include specific alarm trigger and alarm clear times for the PDs that detected the event. In the illustrated example, PD4 and PD5 do not detect the 150 microsecond event since their respective response times are much longer than the event duration; however, PD1, PD2, and PD3 do detect the event because these PDs have response times considerably shorter than the power transient event.

The transient event characterizer 112 compares the alarm interval times for the three PDs that detected the event and, from this comparison and a known correlation between alarm interval times, response times, and event duration, extracts an estimate of the event duration—e.g., 150 ms. Extracting the estimate of the event duration may entail using one of the alarm interval times as the event duration or alternatively, performing computations to estimate an event duration different than the recorded alarm interval times, as may be the case when all of PDs detecting the event have response times too close to the event duration to serve as reliable indicators of the event duration.

In some implementations, the transient event characterizer 112 performs further operations to identify a location of the observed power transient event. In the power transient detection system 103, this is achieved by determining a delay in the detection of the power transient event on identical PDs within each of two nodes on opposite sides of a location 120. In FIG. 1, the location 120 represents a physical origin of the power transient event (e.g., a location where environmental forces are physically acting on the optical fiber 108 and imparting signal noise). When a power transient event occurs at the location 120 between Node A and Node B, the event is detected by a subset of the PDs in the PD bank 106 and also by a corresponding subset of PDs with identical characteristics in the PD bank 114. If, for example, the event is observed by PD1, PD2, and PD3 in the PD bank 106 at node A, these same PDs (with the same response times) observe the event in the PD bank 114 at node B. However, for each pair of PDs with identical response times at opposite ends of the optical fiber 108, there exists a temporal shift in the observed alarm trigger and clear times that varies based on the location 120 of the event transient.

If, for example, the location 120 is exactly at the midpoint between Node A and Node B, the observed shift in observed alarm trigger and clear times is zero, meaning that the alarm is triggered and/or cleared simultaneously on identical PDs in the different banks (e.g., on PD2 in PD bank 106 and on PD2 in PD bank 104). If, however, the location 120 of the transient event is closer to Node B than to Node A, then the event is detected sooner within PD Bank 114 than within PD bank 106. In this case, a difference between alarm trigger and/or clear time on identical PDs in different banks is representative of the additional light-travel time needed for the signal to travel the additional distance to Node A as compared to Node B. Thus, from this difference and the known speed of light, the location 120 of the power transient event can be identified (e.g., "66 km from node A"). In FIG. 1, the transient event characterizer 112 generates outputs 122 that include both the event duration and the event location to a display of a user device, allowing technicians of the optical communication network 100 to quickly diagnose the cause of the event transient and, if applicable, deploy a maintenance crew to the location 120. Notably, some implementations of the disclosed technology may provide for determining either event duration or location but not both of these characteristics.

Figure 2:
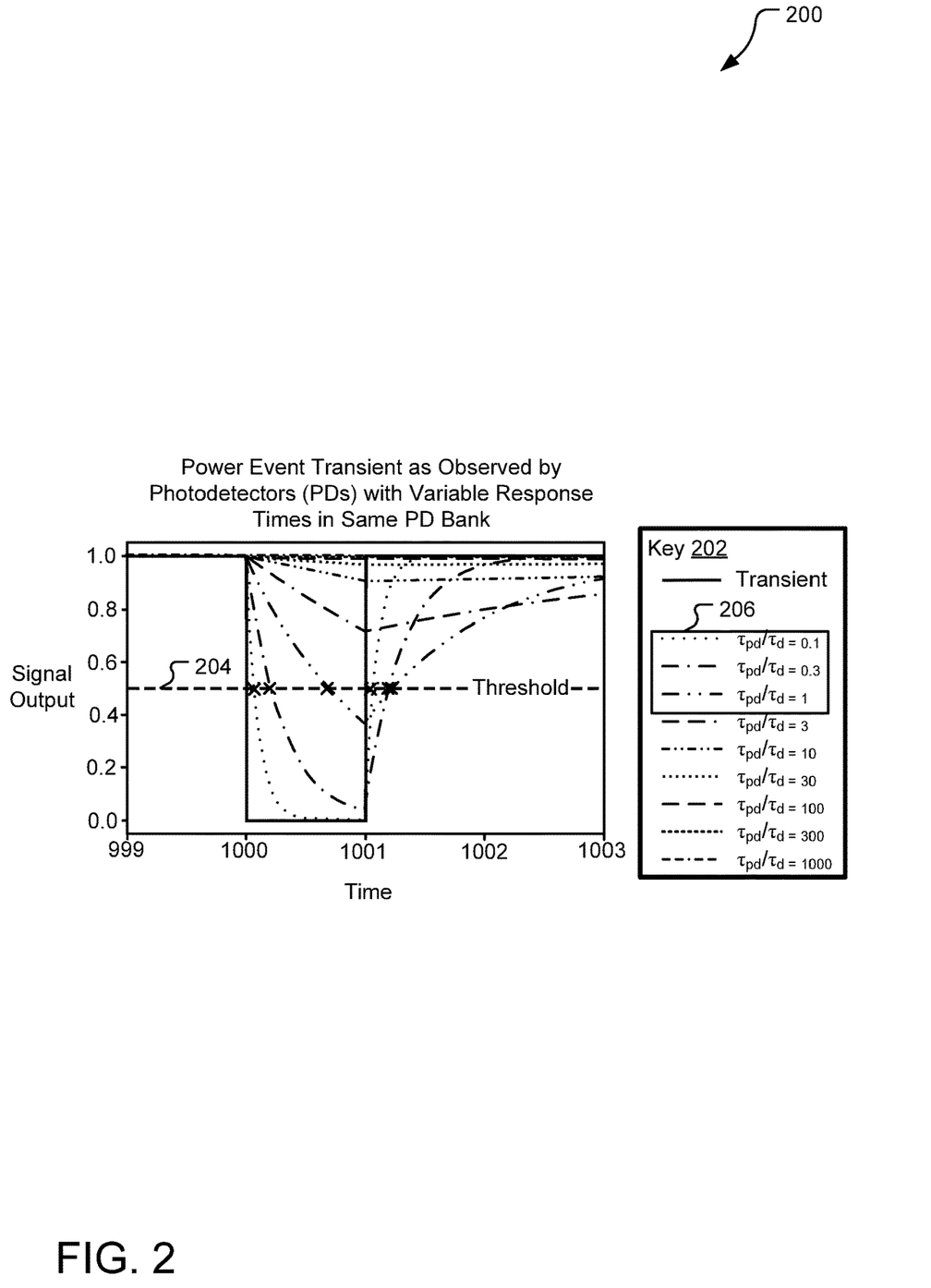
FIG. 2 illustrates an example plot of photodetector signal output for a bank of photodetectors with variable response times located within a node of an optical communication system

FIG. 2 illustrates an example plot 200 of PD signal output for a bank of PDs with variable response times located within a node of an optical communication system. The plot 200 illustrates how the signal output varies on each of the PDs during a short-term power transient event when the PD bank is positioned as shown and described with respect to the optical communication network 100 in FIG. 1. The plot 200 is, in one implementation, generated by an output signal monitor such as the output signal monitor 110 of FIG. 1. The y-axis of the plot shows PD signal output in arbitrary units (a.u.), with "1" representing a full strength signal and "0" representing no signal at all. The y-axis shows time (also in a.u.) increasing from left to right. An actual duration of the power transient event is shown by a solid line—e.g., a square wave form with a start time at 1000 and an end time at 1001.

The plot 200 illustrates how the power transient event is observed by each of nine different PDs with different response times in the PD bank. Each PD in the PD bank is represented by a broken line of a different style, and a map key 202 illustrates this mapping. Specifically, the map key 202 represents each different PD by a ratio of its response time ($\tau_{pd}$) to the duration of the power transient event ($\tau_d$). Notably, this ratio ($\tau_{pd}/\tau_d$) increases in proportion to PD response time since the event duration $\tau_d$ is fixed for the illustrated event. In the map key 202, the PD response times increase from top to the bottom of the page (with the 0.1 ratio corresponding to the quickest PD response time and the 1000 ratio representing the slowest PD response time).

The plot 200 further includes a horizontal line representing a predefined threshold 204. When the power output of a given PD drops below the predefined threshold 204, the PD is said to have detected the "start" of a power transient event. This is also referred to herein as the "alarm trigger time." When the power output of the given PD subsequently rises back above the predefined threshold 204, the PD is said to have detected the "end" of the power transient event. This is also referred to herein as the "alarm clear time." For each PD that detects an event, the alarm interval time is defined by the time between alarm trigger and alarm clear.

In the illustrated example, the power transient event is detected by a subset 206 of the PDs that have the shortest response times.

In various implementations, the predefined threshold 204 may be set to different values. In one implementation, the predefined threshold 204 is set to be −3 dB below the expected (nominal) signal power. In this implementation, the subset of PDs that observe a given event of duration $\tau_d$ include those with a $\tau_{pd}/\tau_d$ ratio that is below ~1.44. In this implementation, PDs with the $\tau_{pd}/\tau_d$ ratio below ~0.33 have alarm interval times that closely correspond to the event duration closely, such as with an error less than 1.7%

Figure 3:
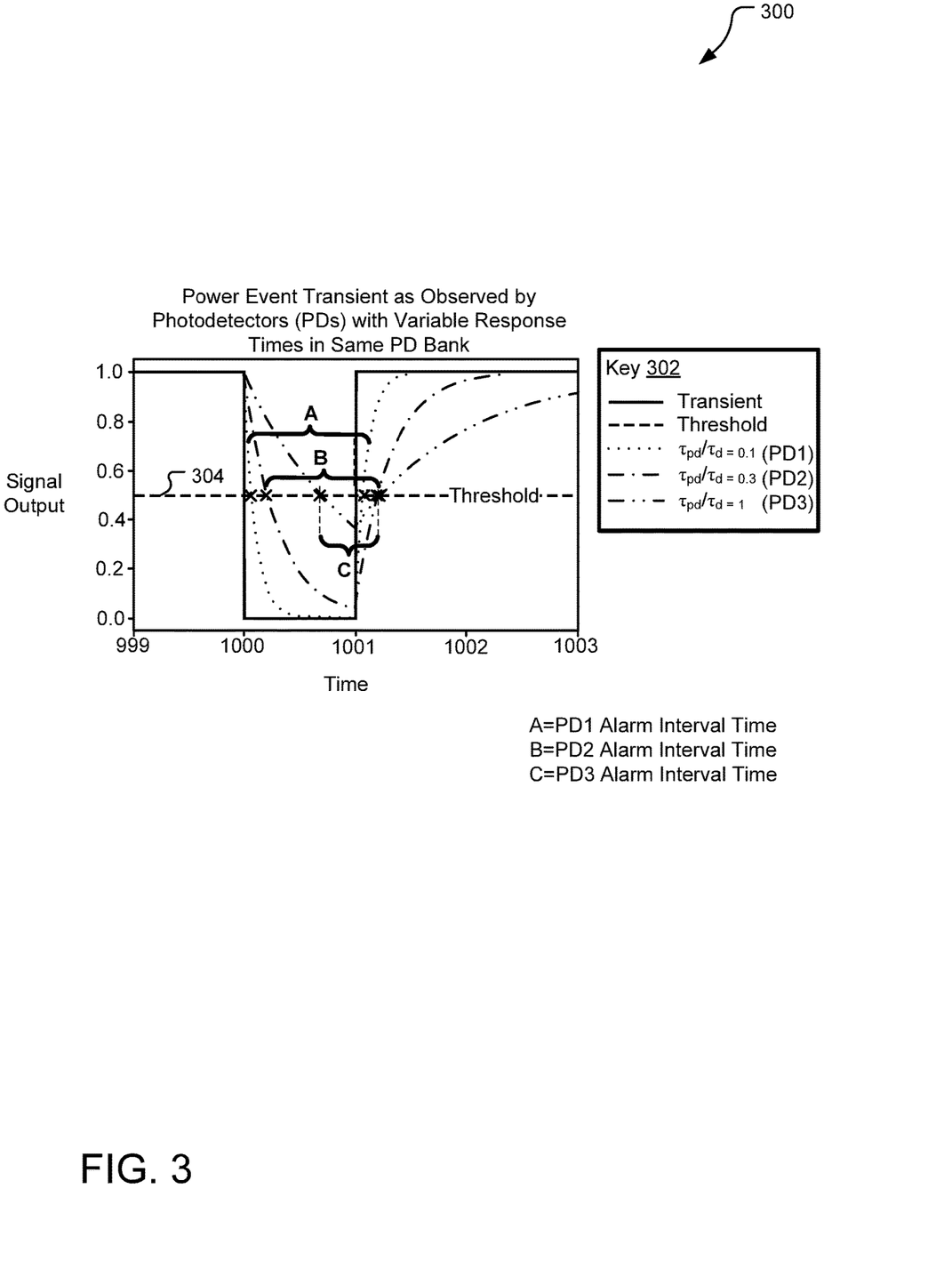
FIG. 3 illustrates a modified version of the plot in FIG. 2 with some data redacted to clarify certain concepts.

FIG. 3 illustrates an example plot 300, which is a modified version of the plot 200 shown with respect to FIG. 2. Specifically, the plot 300 is identical to the plot 200 of FIG. 2 except for the fact that some data is redacted for clarity. Here, the lines on the plot 300 correspond exclusively to the subset of PDs that detected the power transient event. For ease of reference these PDs (corresponding to subset 206 in FIG. 2) are renamed as PD1, PD2, and PD3, as shown by map key 302. Of these three PDs that detected the power transient event, PD1 has the shortest response time, PD3 has the longest response time, and PD2 has a response time that is in between PD1 and PD2.

Annotations have been added to the plot 300 to illustrate the alarm interval time (as defined above) for each of the three PDs, with "A" corresponding to the alarm interval time for PD1, "B" corresponding to the alarm interval time for PD2, and "C" corresponding to the alarm interval time for PD3. In general, it is true that the alarm interval time and PD response time are substantially equal when the PD response time is significantly shorter than the duration of the power transient event. As the PD response time approaches the event duration time, the alarm interval time begins to diverge from the event duration. The exact point at which this divergence begins to occur differs from one implementation to another based on the value of the predefined threshold 304.

After determining that PD1, PD2, and PD3 have observed an event, the next step is to determine which of these PDs satisfies "accuracy criteria" and can be used to measure the event duration. The accuracy criteria of a given PD is said to be "satisfied" when the PD's alarm interval times (A, B, and/or C) is determined to be representative of the event duration within a predefined acceptable margin of error. According to one implementation, this determination entails comparing the alarm interval times for "nearest neighbor" pairs of the PDs, where a nearest neighbor pair refers to a pair of PDs with response times that are sequential in a consecutively arranged sequences of response times for the PDs in the PD bank. For example, the alarm interval time of PD1 is compared to the alarm interval time of PD2 and the alarm interval time of PD2 is compared to the alarm interval time of PD3.

If, for a given event, a ratio of alarm interval times for two nearest neighbor PDs is approximately equal to one, meaning equal to one within a defined error margin of +/−1%, this indicates that both of the PDs satisfy the "accuracy criteria," in which case the alarm interval times of these PDs are known to match the event duration (to within the defined error margin).

Figure 4:
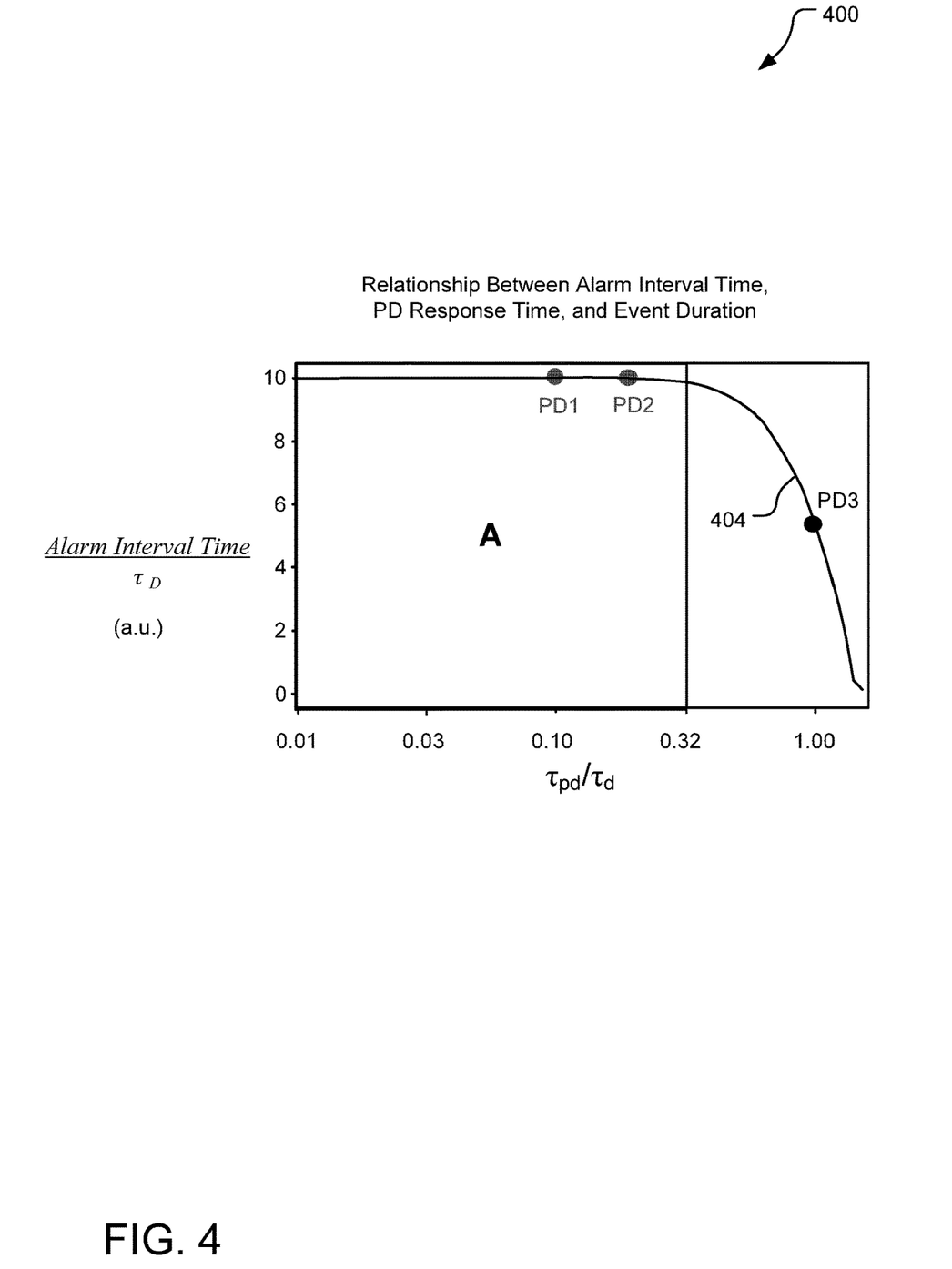
FIG. 4 illustrates a trend plot illustrating a known, monotonic relationship between response times of PDs in a PD bank, alarm interval times, and event duration.

When this ratio of alarm times for two nearest neighbor PDs is not approximately one, this indicates that the alarm interval time of one or both PDs is not as accurate of a measurement of the event time and further analysis is performed to estimate the event duration. Notably, the relative accuracy of the alarm interval time as an estimate of event duration can, in all cases, be derived by constructing a curve with a monotonic first-order derivative, as generally illustrated in FIG. 4 and by identifying where on the curve each PD falls. As is further discussed below, this approach inherently depends on a comparison of nearest-neighbor PD alarm interval times and on a known relationship between PD response times.

FIG. 4 illustrates a trend plot 400 illustrating a known relationship between response times of PDs in a PD bank, alarm interval times, and event duration. Data points shown on the plot (e.g., points labeled PD1, PD2, PD3) correspond to PDs in a PD bank that is part of a transient event detection system in an optical communication network. The PD bank includes an array of PDs with variable response times. In some implementations, the response times of the PDs in the PD bank are characterized by a logarithmic relationship. Other characteristics of the PD bank, transient event detection system, and optical communication network not explicitly described with respect to FIG. 4 are assumed to be the same or similar to other implementations described herein.

In the trend plot 400, the x-axis illustrates a ratio (increasing from left to right) of PD response time ($\tau_{pd}$) to event duration ($\tau_d$). The y-axis indicates a ratio (increasing from bottom to top) of PD alarm interval times time to the event duration ($\tau_d$). Each point shown on the trend plot 400 (e.g., a point 402) represents an individual photodetector having the corresponding response time ($\tau_{pd}$) and alarm interval time for a same power transient event of fixed duration ($\tau_d$).

In a scenario where the PD response times are known (and different from one another), and where two or more PDs in the PD bank detect a power transient event, the duration of the power transient event can be determined from the known response times and the known alarm interval times due to the underlying correlation that is illustrated by the curve 404. Specifically, the event duration can be determined by fitting data points representing PD response times and alarm interval times to the curve 404, which is of monotonic first-order derivative (e.g., regardless of alarm interval times and event duration) and is described by a known function. Therefore, the curve 404 can be derived if two of the three correlated variables—alarm interval time, response time, and event duration—are known for at least two data points.

It is known that when a PD response time is much shorter than the event duration, the alarm time for the PD represents an accurate measurement of the event duration. For example, region A of the trend plot 400 includes PDs with response times ranging between 1 and ⅓ of the event duration. For these PDs, the recorded alarm time represents an accurate measurement of the event duration with error of being of less than +/−1.7%. This corresponds to the scenario when the alarm threshold is set to be −3 dB below the nominal signal level. However, as the PD response time approaches and exceeds the event duration (e.g., as in region B of the trend plot 400, which includes PDs with response times ranging from 33% to 144%), the corresponding alarm time diverges from the event duration.

By example, the trend plot 400 illustrates three points corresponding to three PDs that detected a short-term power transient event. In this example, PD1, PD2, and PD3 each experienced a temporary drop in signal output due to the power transient event, causing an alarm to trigger as generally described above with respect to FIG. 3. It this example, it is further assumed that an alarm interval time has been recorded for each of the three PDs, where the alarm interval time is (as described above) indicative of an elapsed time between alarm trigger (when the PD output dropped below the threshold) and alarm clear (when the PD output rose above the threshold). In this example, PD1 has a faster response time that PD2, and PD2 has a faster response time than PD3.

In general, the y-axis separation of any two PDs in the bank that observed the power transient event can be determined by comparing (e.g., subtracting) the two associated alarm interval times. If, for example the difference between the alarm interval time for PD1 and the alarm interval time for PD2 is zero, this indicates that the y-axis separation is also zero, as generally shown. Likewise, the difference in alarm times of PD2 and PD3 yields a difference of roughly 2.2 a.u., which translates to the y-axis separation that is shown between PD2 and PD3.

Since the curve 404 is described by a known function, any pair of data points can be fit to the curve 404 based on the known y-axis separation (e.g., determined by comparing the alarm interval times) and based on the respective known PD response times. This curve-fitting operation relies on mathematical methods readily known in the art.

Consistent with the logic described above, one implementation of the disclosed technology provides for fitting data points corresponding to different PDs to a known function curve. From the resulting fitted curve, it can be quickly determined which, if any, of the PDs have alarm interval times that accurately represent the event duration to within a predefined threshold margin of error. If, as explained above, a data point for a particular PD falls within region A of the trend plot 400 where the slope is generally flat, it is known that the event duration is approximately equal to the alarm interval time of that PD.

If, on the other hand, it is determined that the event was not observed by any PDs in region A, additional steps are performed to estimate the event duration. Specifically, the curve 404 and fitted data points (e.g., in region B) can be used to infer the alarm time of a PD that would fall within region A if included in the PD bank—e.g., with a response time that is less than 32% or so of the event duration. Per this methodology, an ideal data point is identified on the curve 404 (e.g., that has already been fit, per the above approach, to the known distribution of PDs that detected the event). The "ideal data point" is a data point that lies in Region A, which is a region of the curve 404 with zero slope. The Y-axis coordinate of this ideal data point (e.g., the alarm interval time) is then used as the event duration estimate. The above analysis can be implemented using mathematics readily understood in the art.

Per the above-described techniques, the duration of a power transient event can be determined based on (1) a known distribution between PD response times for a collection of PDs that detected an event and (2) a known (measured) relationship between alarm interval times for those PDs, even if the event duration is much shorter than all PDs in the bank (e.g., in scenarios where the alarm interval time cannot be accurately estimated from the alarm interval time of any individual one of the PDs that detected the event).

Notably, there exist some event scenarios where the PD with the fastest response time could, alone, be used to determine the duration of the event, particularly if the fastest PD has a very fast response time (e.g., 1 microsecond) and the event is known to be orders of magnitude larger (e.g., because it is detected by another PD with a response time of that higher order), such as on the order of 10 ms). However, reliance on a single fastest PD provides a single point of failure, meaning that if the PD fails, so too does the system's capability of detecting power transient events. In addition, PDs with faster response times tend to more expensive to manufacture and more sensitive to electrostatic discharge (ESD) events that cause catastrophic component failure. For the above reasons, it is actually cost-beneficial to determine the event duration utilizing an array of PDs that have relatively slow response times relative to the fastest transient events. In one implementation, the PD bank utilized in the disclosed diagnostic system includes a fastest-response PD with a response time ~0.3-0.5 of the fastest transient events (e.g., typically ~75 microseconds), which is a response time of about 20-40 microseconds.

Figure 5:
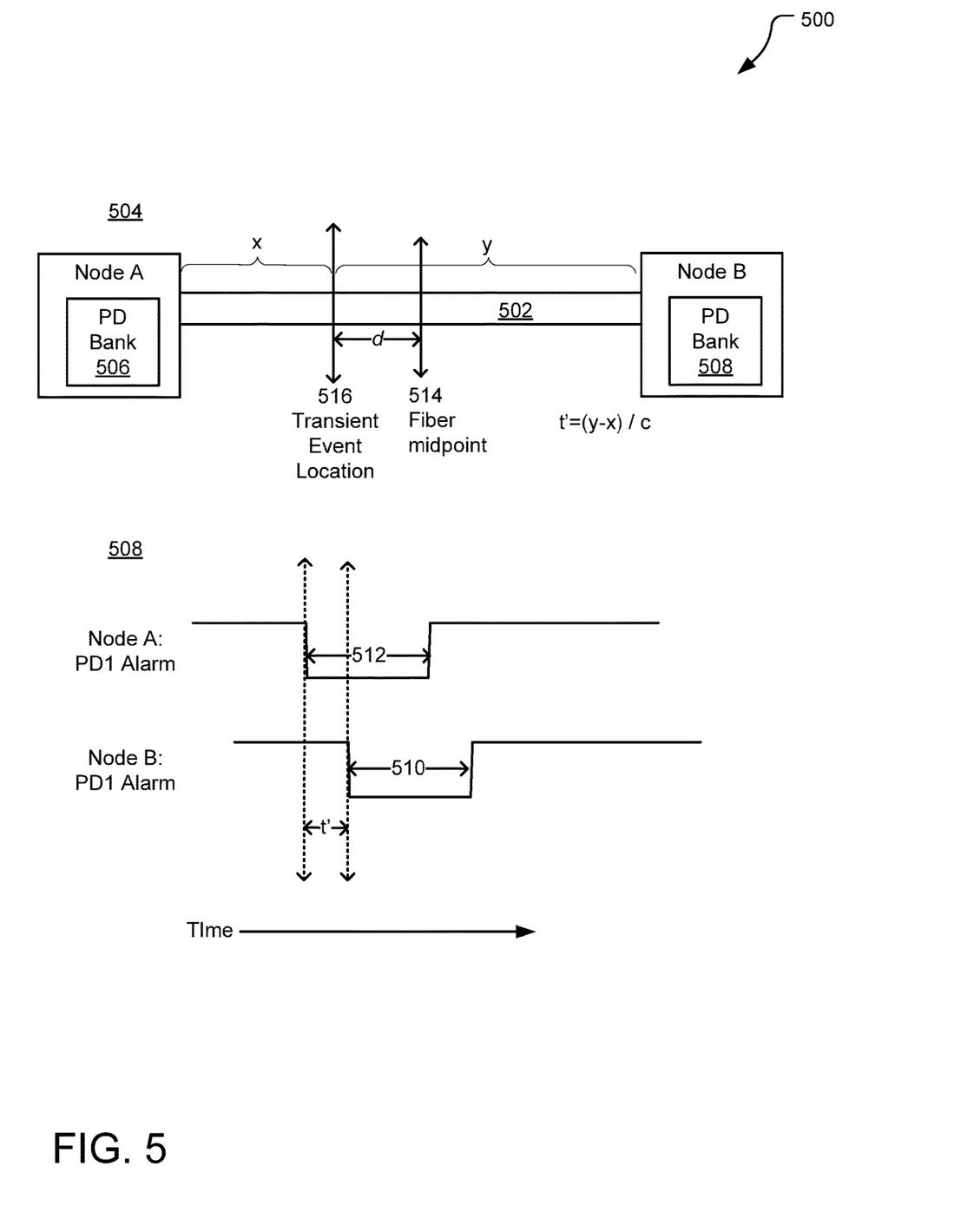
FIG. 5 illustrates aspects of an exemplary technique for determining a physical source of a power event transient along a fiber optic cable in a communication network.

FIG. 5 illustrates aspects of an exemplary technique 500 for determining a physical source (location) of a power event transient along a fiber optic cable in a communication network. The exemplary technique 500 relies on a physical architecture the same or similar to that discussed with respect to FIG. 1, with banks of PDs (e.g., PD banks 506 and 508) in each of two nodes (e.g., Node A and Node B) abutting opposite ends of a length of fiber optic cable 502. At least one PD in the PD bank 506 has a response time equal to a corresponding PD in the PD bank 508. In one implementation, the PD banks 506 and 508 are identical, and each PD in the PD bank 506 has a response time identical to a corresponding one of the PDs in the PD bank 508.

Although not shown in FIG. 5, each of the PD banks is coupled to an output signal monitor that monitors the output signal of each individual one of the PDs. When the output signal of any one of the PDs drops below a defined threshold, this triggers an alarm for the PD. The alarm is active until such time that the output signal of the PD increases above the threshold, at which time the alarm is cleared.

Notably, most power transient events are bidirectional in the sense that the event impacts a portion of fiber optical cable and equally impacts signals traveling along the cable in both direction. In this scenario, an event detected by a PD in the PD bank 506 of Node A (e.g., in a receiver of Node A) is also seen by the corresponding PD with the identical response time in the PD bank 508 of Node B (e.g., in a receiver of Node B). View 508 illustrates an example of how a pair of PDs with identical response times observe the same power transient event from their respective locations on opposite ends of the fiber optic cable 502. In this example, an alarm interval time 510 for a PD (PD1) in Node A is identical to an alarm interval time 512 for a corresponding (identical) PD (also referred to as PD1) in Node B, but there is a delay between when PD1 in node A detects the event relative to the detection of the event by PD1 in Node B. The magnitude of this delay, represented by variable t', fluctuates in proportion to a separation (d) between a midpoint 514 of the fiber optic cable 502 and the physical origin of the event (e.g., the transient event location 516).

If the transient event location 516 were to align with the midpoint 514, the delay t' would be zero (meaning the identical PDs observe the event at identical times). However, in the illustrated scenario where the transient event location 516 is closer to Node A than to Node B, the PD in ode A detects the event before the identical PD in Node B due to the increased path distance (d) that the disrupted signal traverses in route to Node B. This increased travel time can be generally represented as (y-x) divided by the speed of light (c), where y is the distance between Node B and the transient event location 516 and where x is the distance between Node A and the transient event location 516.

Per the above-described relations, the distance 'd' can be solved for based on the measured delay time t'. This technique is, in one implementation, performed by software of a transient power event detection system (e.g., the transient event characterizer 112 of FIG. 2).

In the case of a unidirectional transient (which are less common), a transient event affects the signal traveling in a single direction. For example, the PD bank in the receiver (RX) component of Node A detects the transient event but there is no detection at an RX component of Node B. However, in this case the location of the power transient event can still be determined provided that additional PD banks are also included in the transmitter (TX) component of both nodes. Specifically, the location of the transient event can be determined by comparing the real signal that is detected with an OSC signal that is continuously transmitted in an opposite direction. If, for example, a transient event is detected by the PD bank in the RX of Node A and an OSC signal is also continuously transmitted from the RX component of Node A toward the TX component of Node B (e.g., essentially sending a test signal in a direction opposite to that of the real signal but along the same line), the two signals can then be compared and analyzed. In this example, the TX component in the Node B receives the test signal, and the received test signal includes the same signature of the unidirectional transient event that was detected in the real signal in the RX component of Node A. Here, the location of the transient event can be determined in a manner similar to that described above by determining a delay time between (1) an alarm triggered by a PD in the bank of Node A's RX component (e.g., based on observation of the real signal) and (2) an alarm triggered by a PD of equal response time that is in the bank of Node B's TX component (e.g., based on observation of the test signal).

Figure 6:
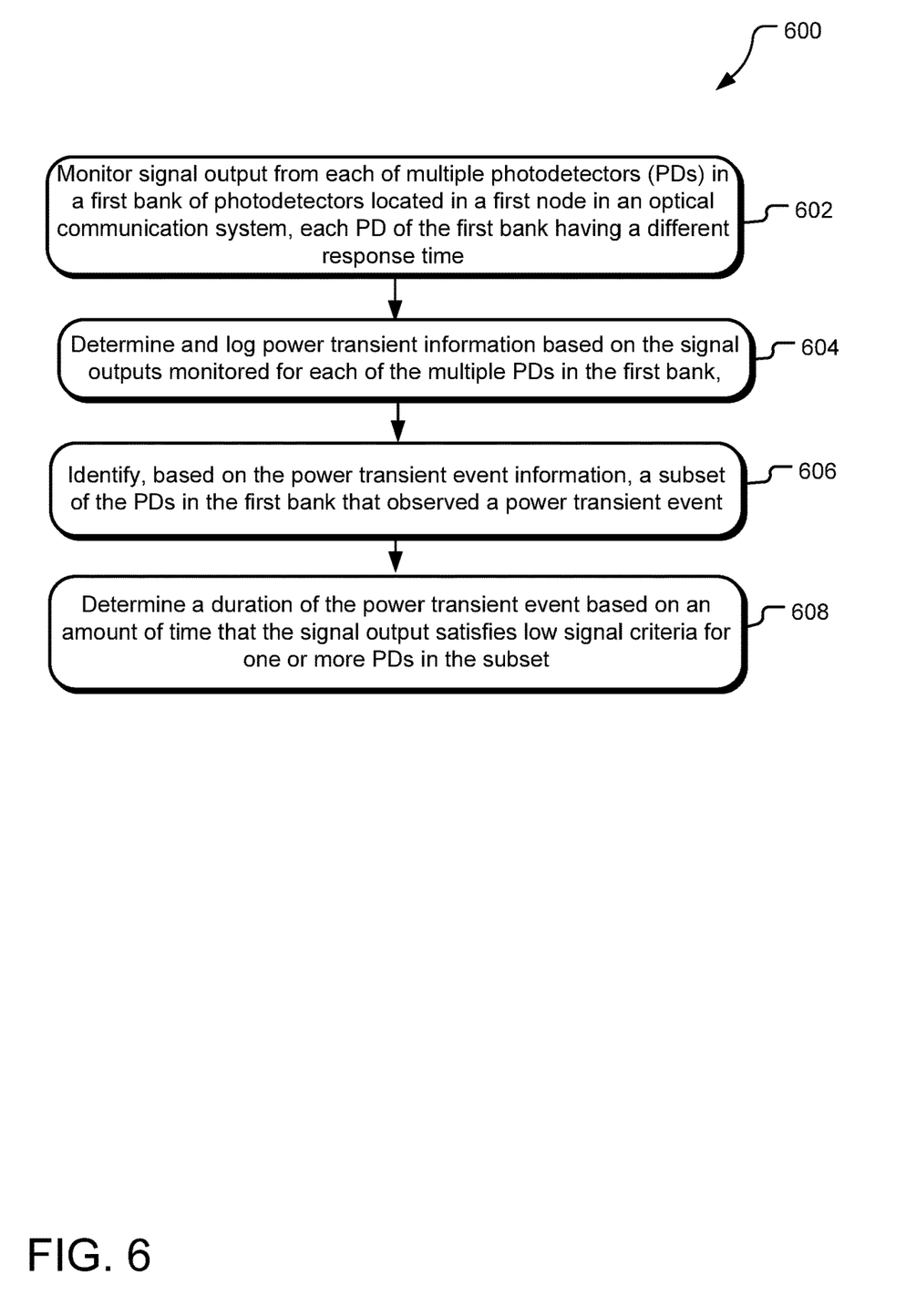
FIG. 6 illustrates example operations for determining a duration of a short-term power transient event within an optical communication network.

FIG. 6 illustrates example operations 600 for determining a duration of a short-term power transient event within an optical communication network. A monitoring operation 602 monitors signal output from each of multiple photodetectors in a first bank of photodetectors located in a first node of an optical communication system. Each PD in the first bank has a different response time. In one implementation, the distribution of response times of the PDs in the PD bank span a range of starting at 30-50% of the fastest transient events targeted by the system (e.g., ~75 microseconds) up to about 100% or more of the fastest transient events.

A logging operation 604 logs, based on the signal outputs monitored, power transient event information. In one implementation, the logged power transient event information includes at least an alarm trigger time and an alarm clear time for each PD in the PD bank that observes a particular transient event. The alarm trigger time corresponds to the time that the output signal for a given PD crosses a threshold when the output signal strength is decreasing and the alarm clear time corresponds to the time that the output signal for the given PD again crosses the threshold as the output signal is increasing in strength.

An identifying operation 606 identifies, based on power transient information, a subset of the PDs in the first bank of photodetectors that observed a power transient event.

A determining operation 608 determines a duration of the power transient event based on an amount of time that the signal output satisfies low signal criteria for one or more PDs in the subset. In one implementation, the determining operation 608 includes comparing an alarm interval time (e.g., time between alarm trigger and alarm clear) for each PD in the subset and subsequently identifying two more of the PDs in the subset that have alarm interval times that are identical to within a predefined threshold margin of error. In this scenario, the identical alarm interval times signify that the two PDs have response times substantially faster than the event duration. Consequently, the alarm interval time is determined based on the alarm interval times of the two compared PDS (e.g., either one of the alarm interval times is taken individual as the event duration or the alarm interval times are averaged or otherwise combined to derive the event duration).

In another implementation, the determining operation includes comparing the alarm interval times of the different PDs in the subset as part of a curve fitting operation that fits data points corresponding to the PDs to a curve of known form (e.g., the curve 404 of FIG. 4 illustrating a correlation between response time, transient event duration, and alarm interval time. Following the curve fitting operation, an ideal data point is identified on a flat portion of the curve (e.g., a zero-slope area known to correspond to PDs with response times significantly faster than the event duration), and the coordinates of the ideal data point are used to provide the estimate of the event duration.

Figure 7:
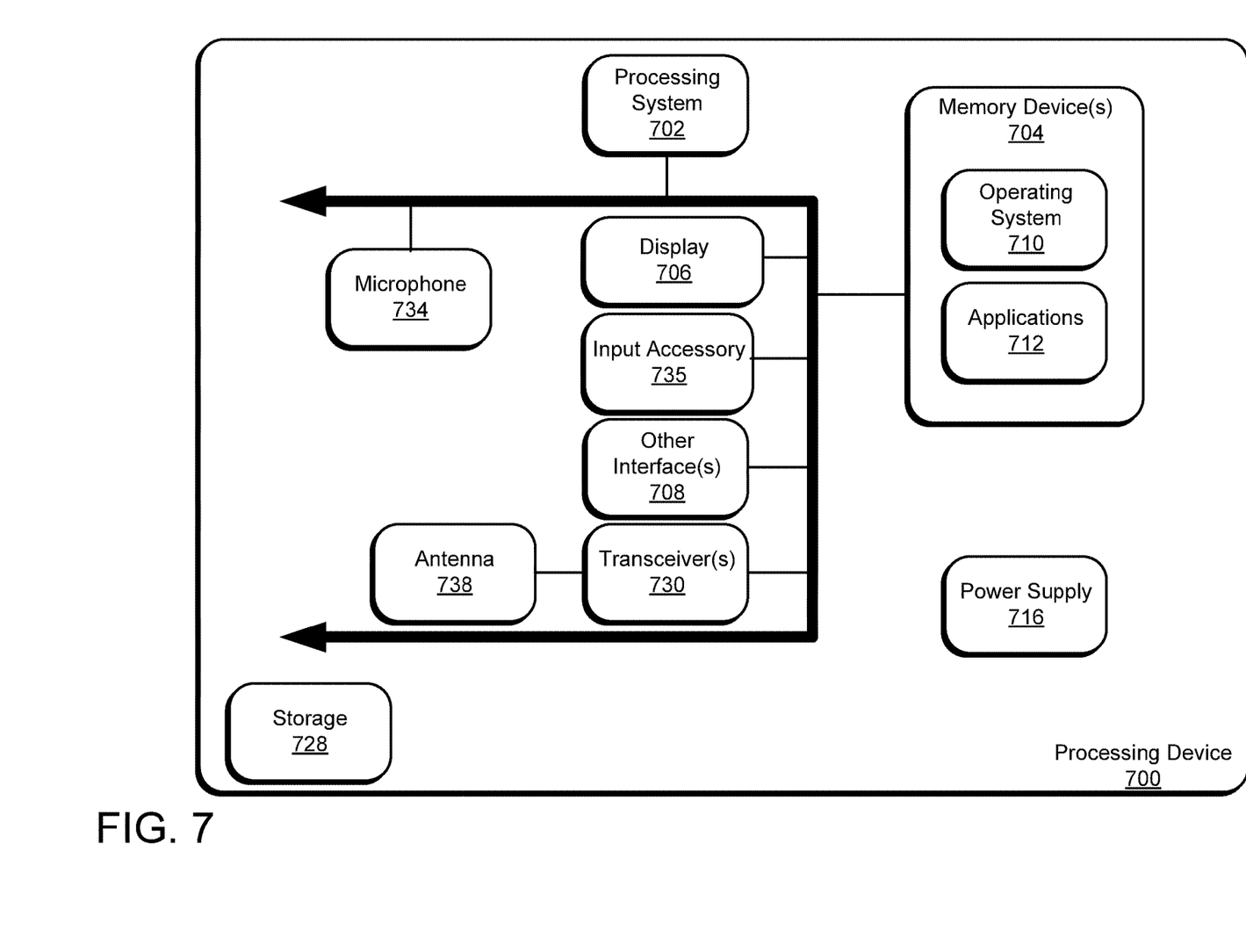
FIG. 7 illustrates an example schematic of a processing device suitable for implementing aspects of the disclosed technology.

FIG. 7 illustrates an example schematic of a processing device 700 suitable for implementing aspects of the disclosed technology. The processing devices 700 includes one or more processor unit(s) 702, memory device(s) 704, a display 706, and other interfaces 708 (e.g., buttons). The processor unit(s) 702 may each include one or more CPUs, GPUs, etc.

The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, may resides in the memory 704 and be executed by the processor unit(s) 702, although it should be understood that other operating systems may be employed.

One or more applications 712 (e.g., the output signal monitor 110 or the transient event characterizer 112 of FIG. 1) are loaded in the memory 704 and executed on the operating system 710 by the processor unit(s) 702. The applications 712 may receive inputs from one another as well as from various input local devices such as a microphone 734, input accessory 735 (e.g., keypad, mouse, stylus, touchpad, gamepad, racing wheel, joystick), and a camera 732. Additionally, the applications 712 may receive input from one or more remote devices, such as remotely-located smart devices, by communicating with such devices over a wired or wireless network using more communication transceivers 730 and an antenna 738 to provide network connectivity (e.g., a mobile phone network, Wi-Fi®, Bluetooth®). The processing device 700 may also include one or more storage devices 728 (e.g., non-volatile storage). Other configurations may also be employed.

The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example power transient event detection system disclosed herein includes a first bank of photodetectors (PDs) located at a first node in an optical communication system and an output signal monitor configured to monitor signal output from each of the PDs in the first bank and log power transient event information. Each PD of the first bank of PDs has a different response time. The system further includes transient event characterizer that is configured to identify, based on the power transient event information logged in association with each of the PDs in the first bank, a subset of the PDs in the first bank that observed a power transient event and also configured to determine a duration of the power transient event based on an amount of time that the signal output satisfies low signal criteria for at least one PD in the subset.

In another example system of any preceding system, the transient event characterizer identifies the subset of PDs in the first bank that observed the power transient event by identifying specific PDs in the first bank that detected a signal disruption satisfying the low signal criteria. The low signal criteria is characterized by a drop in the signal output of a PD below a threshold followed by an increase in signal output of the PD above the threshold.

In still yet another example system of any preceding system, the transient characterizer determines the duration of the power transient event by determining, for multiple PDs in the subset that observed the power transient event, an alarm interval time corresponding to an amount of time that signal output of the PD satisfies the low signal criteria in association with the power transient event.

In still yet another example system of any preceding system, the transient event characterizer determines the duration of the power transient event based on the alarm interval time of at least one PD in the subset with a response time less than or equal to a duration of the power transient event.

In still another example system of any preceding system, the transient event characterizer is further configured to identify, based on a comparison of the alarm interval time determined for each of the PDs in the subset, a pair of PDs in the subset with characteristics satisfying accuracy criteria; and to determine the duration of the power transient event based on the alarm interval time of the pair of PDs.

In yet still another example system of any preceding system, a PD is determined to have the characteristics satisfying the accuracy criteria when a ratio of alarm interval times for the pair of PDs is approximately equal to one.

In still another example system of any preceding system, the transient characterizer is further configured to fit, to a curve, a data point corresponding to each one of the PDs in the subset, the curve being defined by a known function that depends upon PD response time and alarm interval time; identity an ideal data point on the curve in a region of zero slope; and estimate the duration of the power transient event based on coordinates of the ideal data point.

In still another example system of any preceding system, the power transient event occurs between a first node and a second node. The power transient detection system further includes a second bank of photodetectors (PDs) located at the second node, and a first distribution of response times for the PDs in the second bank is identical to a second distribution of response times for the PDs in the second bank.

In yet still another example system of any preceding system, the transient characterizer is further configured to identify a location of the power transient event between the first node and the second node based on a time delay between observation of the power transient event by a first PD in the first bank and a second PD in the second bank. The second PD has a response time identical to the first PD.

An example method disclosed herein includes monitoring signal output from each of multiple photodetectors (PDs) in a first bank of PDs located at a first node in an optical communication system, and logging, based on the signal outputs monitored for each of the multiple PDs in the first bank, power transient event information. Each PD of the first bank of PDs has a different response time. The method further includes identifying, based on the power transient event information logged for each of the multiple PDs in the first bank, a subset of the PDs in the first bank that observed a power transient event, and determining a duration of the power transient event based on an amount of time that the signal output satisfies low signal criteria for at least one PD in the subset.

In another example method of any preceding method, identifying the subset of PDs in the first bank that observed the power transient event further comprises identifying specific PDs in the first bank that detected a signal disruption satisfying the low signal criteria. The low signal criteria is characterized by a drop in the signal output of a PD below a threshold followed by an increase in signal output of the PD above the threshold.

In yet still another example method of any preceding method, determining the duration of the power transient event further comprises determining, for multiple PDs in the subset that observed the power transient event, an alarm interval time corresponding to an amount of time that signal output of the PD satisfies the low signal criteria in association with the power transient event.

In still another example method of any preceding method, determining of the duration of the power transient event is based on the alarm interval time of at least one PD in the subset with a response time less than or equal to a duration of the power transient event.

In yet another example method of any preceding method, determining the duration of the power transient event further includes identifying, based on a comparison of the alarm interval time determined for each of the PDs in the subset, a pair of PDs in the subset with characteristics satisfying accuracy criteria and determining the duration of the power transient event based on the alarm interval times of the pair of PDs.

In another example method of any preceding method, a PD is determined to have the characteristics satisfying the accuracy criteria when a ratio of alarm interval times for the pair of PDs is approximately equal to one.

In another example method of any preceding method, the method further comprises fitting, to a curve, a data point corresponding to each one of the PDs in the subset, the curve being defined by a known function that depends upon PD response time and alarm interval time; identifying an ideal data point on the curve in a region of zero slope; and estimating the event duration based on coordinates of the ideal data point.

In still another example method of any preceding method, the power transient event occurs between a first node and a second node and the method further comprises monitoring signal output from each PD in a second bank of PDs located at the second node. In this implementation, a first distribution of response times for the PDs in the second bank is identical to a second distribution of response times for the PDs in the second bank.

In still another example method of any preceding method, the method further comprises identifying a location of the power transient event between the first node and the second node based on a time delay between observation of the power transient event by a first PD in the first bank and a second PD in the second bank, the second PD having a response time identical to the first PD.

In yet another aspect, some implementations include a computer-readable storage medium for storing computer-readable instructions. The computer-readable instructions, when executed by one or more hardware processors, perform any of the methods described herein.

An example system disclosed herein includes a means for monitoring signal output from each of multiple photodetectors (PDs) in a first bank of PDs located at a first node in an optical communication system and a means for logging, based on the signal outputs monitored for each of the multiple PDs in the first bank, power transient event information. Each PD of the first bank of PDs has a different response time. The system further includes a means for identifying, based on the power transient event information logged for each of the multiple PDs in the first bank, a subset of the PDs in the first bank that observed a power transient event and a means for determining a duration of the power transient event based on an amount of time that the signal output satisfies low signal criteria for at least one PD in the subset.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A power transient event detection system comprising:
   a first bank of photodetectors (PDs) located at a first node in an optical communication system, each PD of the first bank of PDs having a different response time;
   an output signal monitor configured to monitor signal output from each of the PDs in the first bank and log power transient event information; and
   a transient event characterizer configured to identify, based on the power transient event information logged in association with each of the PDs in the first bank, a subset of the PDs in the first bank that observed a power transient event; and
   determine a duration of the power transient event based on an amount of time that the signal output is below a threshold for at least one PD in the subset.

2. The power transient event detection system of claim 1, wherein the transient event characterizer identifies the subset of PDs in the first bank that observed the power transient event by identifying specific PDs in the first bank that detected a signal disruption satisfying the low signal criteria, the low signal criteria being characterized by a drop in the signal output of a PD below a threshold followed by an increase in signal output of the PD above the threshold.

3. The power transient event detection system of claim 2, wherein the transient event characterizer determines the duration of the power transient event by determining, for multiple PDs in the subset that observed the power transient event, an alarm interval time corresponding to an amount of time that signal output of the PD satisfies the low signal criteria in association with the power transient event.

4. The power transient event detection system of claim 3, wherein the transient event characterizer determines the duration of the power transient event based on the alarm interval time of at least one PD in the subset with a response time less than or equal to a duration of the power transient event.

5. The power transient event detection system of claim 3, wherein the transient event characterizer is further configured to:
    identify, based on a comparison of the alarm interval time determined for each of the PDs in the subset, a pair of PDs in the subset that have a ratio of alarm interval times approximately equal to one; and
    determine the duration of the power transient event based on the alarm interval time of the pair of PDs.

6. The power transient detection system of claim 5, wherein the transient characterizer is further configured to:
    fit, to a curve, a data point corresponding to each one of the PDs in the subset, the curve being defined by a known function that depends upon PD response time and alarm interval time;
    identity a data point on the curve in a region of zero slope; and
    estimate the duration of the power transient event based on coordinates of the data point.

7. The power transient event detection system of claim 1, wherein the power transient event occurs between a first node and a second node and the power transient detection system further includes:
    a second bank of photodetectors (PDs) located at the second node, wherein a first distribution of response times for the PDs in the second bank is identical to a second distribution of response times for the PDs in the second bank.

8. The power transient event detection system of claim 7, wherein the transient characterizer is further configured to identify a location of the power transient event between the first node and the second node based on a time delay between observation of the power transient event by a first PD in the first bank and a second PD in the second bank, the second PD having a response time identical to the first PD.

9. A method comprising:
    monitoring signal output from each of multiple photodetectors (PDs) in a first bank of PDs located at a first node in an optical communication system, each PD of the first bank of PDs having a different response time;
    logging, based on the signal outputs monitored for each of the multiple PDs in the first bank, power transient event information;
    identifying, based on the power transient event information logged for each of the multiple PDs in the first bank, a subset of the PDs in the first bank that observed a power transient event; and
    determining a duration of the power transient event based on an amount of time that the signal output is below a threshold for at least one PD in the subset.

10. The method of claim 9, wherein identifying the subset of PDs in the first bank that observed the power transient event further comprises:
    identifying specific PDs in the first bank that detected a signal disruption satisfying the low signal criteria, the low signal criteria being characterized by a drop in the signal output of a PD below a threshold followed by an increase in signal output of the PD above the threshold.

11. The method of claim 9, wherein determining the duration of the power transient event further comprises:
    determining, for multiple PDs in the subset that observed the power transient event, an alarm interval time corresponding to an amount of time that signal output of the PD satisfies the low signal criteria in association with the power transient event.

12. The method of claim 11, wherein the determining of the duration of the power transient event is based on the alarm interval time of at least one PD in the subset with a response time less than or equal to a duration of the power transient event.

13. The method of claim 11, wherein determining the duration of the power transient event further comprises:
    identifying, based on a comparison of the alarm interval time determined for each of the PDs in the subset, a pair of PDs in the subset that have a ratio of alarm interval times approximately equal to one; and
    determining the duration of the power transient event based on the alarm interval times of the pair of PDs.

14. The method of claim 9, further comprising:
    fitting, to a curve, a data point corresponding to each one of the PDs in the subset, the curve being defined by a known function that depends upon PD response time and alarm interval time;
    identifying a data point on the curve in a region of zero slope; and
    estimating the event duration based on coordinates of the data point.

15. The method of claim 9, wherein the power transient event occurs between a first node and a second node and the method further comprises:
    monitoring signal output from each PD in a second bank of PDs located at the second node, wherein a first distribution of response times for the PDs in the second bank is identical to a second distribution of response times for the PDs in the second bank.

16. The method of claim 15, further comprising:
    identifying a location of the power transient event between the first node and the second node based on a time delay between observation of the power transient event by a first PD in the first bank and a second PD in the second bank, the second PD having a response time identical to the first PD.

17. One or more tangible computer-readable storage media encoding computer-executable instructions for executing a computer process comprising:
    monitoring signal output from each of multiple photodetectors (PDs) in a first bank of photodetectors (PDs) located at a first node of an optical communication system, each PD of the first bank of PDs having a different response time;
    logging, based on the signal outputs monitored for each of the multiple PDs in the first bank, power transient event information;
    identifying, based on the power transient event information logged for each of the multiple PDs in the first bank, a subset of the PDs in the first bank that observed a power transient event;
    comparing the signal outputs for the subset of the PDs in the first bank that observed the power transient event; and
    determining, based on the comparing, a duration of the power transient event.

18. The one or more tangible computer-readable storage media of claim 17, wherein comparing the signal outputs for the subset of the PDs in the first bank that observed the power transient event further comprises:
- comparing alarm interval times for each of the PDs in the subset, each alarm interval time of the alarm interval times representing an amount of time that the signal output is below a threshold for a corresponding one of the PDs;
- identifying two or more PDs in the subset for which the corresponding alarm interval times are approximately equal; and
- determining the duration of the power transient event based on the alarm interval times of the two or more PDs.

* * * * *